United States Patent Office.

HENRY LOEWENBERG, OF NEW YORK, N. Y., ASSIGNOR TO HIMSELF AND EMILE GRANIER.

Letters Patent No. 63,734, dated April 9, 1867.

IMPROVED MARKING COMPOUND.

The Schedule referred to in these Letters Patent and making part of the same.

TO ALL WHOM IT MAY CONCERN:

Be it known that I, HENRY LOEWENBERG, of No. 1 Park Place, in the city, county, and State of New York, have invented a new and improved Indelible Marking Compound; and I do hereby declare that the following is a full, clear, and exact description thereof, which will enable those skilled in the art to make and use the same.

This invention relates to a compound or mixture made either in a liquid or in a solid state, and capable of producing indelible marks on textile or fibrous fabrics, paper, or other materials.

The invention consists in mixing common ink or other marking fluid, or ordinary pencils or other marking materials, with iodine or bromine, or both combined, in a liquid or in a dry state, in combination with gums, resinous or other adhesive substances, to produce the desired consistency, in such a manner that, by the action of the iodine or bromine, or both, marks made with the marking material will be rendered indelible.

In preparing an indelible ink or marking fluid, I take common writing or printing ink, and add to it the desired quantity of iodine or bromine, or of both. These chemicals may be taken in a dry state, and dissolved directly in the ink or marking fluid, or a solution may be prepared from the same, either in water or in any other suitable solvent which can be readily mixed with the ink or other marking fluid. If iodine or bromine is to be mixed with a pencil or other solid marking substance, I grind the ingredients together and render the same adhesive by the addition of suitable gums or cements. By adding starch to the iodine, a brilliant violet color may be given to the marking material, and, if desired, various different colors may be produced by adding suitable pigment or coloring materials.

What I claim as new, and desire to secure by Letters Patent, is—

A marking compound, either in a liquid or solid form, containing iodine or bromine, either or both, substantially as and for the purpose set forth.

HENRY LOEWENBERG.

Witnesses:
W. HAUFF,
N. MEYER.